US012800602B2

(12) United States Patent
Gao et al.

(10) Patent No.: US 12,800,602 B2
(45) Date of Patent: Nov. 17, 2026

(54) SAMPLE PRE-TREATMENT SYSTEM

(71) Applicant: MGI Tech Co., Ltd., Shenzhen (CN)

(72) Inventors: Jiandong Gao, Shenzhen (CN); Jing Li, Shenzhen (CN); Qiang Sun, Shenzhen (CN); Xuejiang Zhao, Shenzhen (CN)

(73) Assignee: MGI Tech Co., Ltd., Shenzhen (CN)

( * ) Notice: Subject to any disclaimer, the term of this patent is extended or adjusted under 35 U.S.C. 154(b) by 889 days.

(21) Appl. No.: 18/016,593

(22) PCT Filed: Jul. 23, 2020

(86) PCT No.: PCT/CN2020/103896

§ 371 (c)(1),
(2) Date: Jan. 17, 2023

(87) PCT Pub. No.: WO2022/016475

PCT Pub. Date: Jan. 27, 2022

(65) Prior Publication Data

US 2023/0288441 A1 Sep. 14, 2023

(51) Int. Cl.
*G01N 35/00* (2006.01)
*G01N 1/34* (2006.01)

(52) U.S. Cl.
CPC ........... *G01N 35/0099* (2013.01); *G01N 1/34* (2013.01)

(58) Field of Classification Search
CPC ................. G01N 35/0099; G01N 1/34; G01N 35/00732; G01N 2035/0405;
(Continued)

(56) References Cited

U.S. PATENT DOCUMENTS 5,054,836 A * 10/1991 Schulz ................. B25J 15/0206 414/932
2006/0266719 A1* 11/2006 Knight ................. G01N 35/025 211/74
(Continued)

FOREIGN PATENT DOCUMENTS

CN 106367343 A 2/2017
CN 108408670 A 8/2018
(Continued)

*Primary Examiner* — Dennis White
(74) *Attorney, Agent, or Firm* — ScienBiziP, P.C.

(57) ABSTRACT

A sample pre-treatment system includes a sample storage module, a sample transfer module, a cover separating and closing module, a delivery module, a pipetting module and a control module. The sample storage module stores a container containing a biological sample. The sample transfer module grabs the container and transfers same to the delivery module. The delivery module delivers the container to the cover separating and closing module and the pipetting module, respectively. The cover separating and closing module scans identification codes of the container on the delivery module, and separates a cover from a container body of the container. The pipetting module performs distribution on the biological sample on the delivery module. The cover separating and closing module re-closes the cover on the container body on the delivery module. The sample transfer module transfers the container back. The control module controls the above modules to work cooperatively.

15 Claims, 12 Drawing Sheets

(58) Field of Classification Search
CPC ..... G01N 2035/0406; G01N 2035/0418; B25J 11/00; C12M 33/04; C12M 37/02; C12M 41/48; C12M 45/22; C12M 23/38
See application file for complete search history.

(56) References Cited

U.S. PATENT DOCUMENTS

| | | | | |
|---|---|---|---|---|
| 2013/0065797 | A1* | 3/2013 | Silbert .................. | G01F 23/265 73/304 C |
| 2016/0299163 | A1 | 10/2016 | Kappelhoff et al. | |
| 2020/0141961 | A1* | 5/2020 | Ahlfors .................. | G01N 35/00 |

FOREIGN PATENT DOCUMENTS

| | | | |
|---|---|---|---|
| CN | 108603155 | A | 9/2018 |
| CN | 108738348 | A | 11/2018 |
| WO | 2017143182 | A2 | 8/2017 |
| WO | 2018/053783 | A1 | 3/2018 |
| WO | 2020055801 | A1 | 3/2020 |

* cited by examiner

SAMPLE PRE-TREATMENT SYSTEM

FIELD

The subject matter relates to field of biochemical monitor, and more particularly, to a sample pre-treatment system.

BACKGROUND

Because of the occurrences of epidemic, it is imminent to increase the speed of nucleic acid detection of the novel coronavirus. For the collected samples, prior to nucleic acid extraction, inactivation, subpackaging and transferring, and other pre-processes, such as subpacckaging and transferring, are required. Subpackaging and transferring require a series of processes such as manual information checking, test tube opening, pipetting (that is, transferring the sample in the test tube to a deep well plate), test tube closing and recycling. Due to the epidemic, there are massive number of samples which need to be tested quickly. Manual operations greatly affect the speed of subsequent nucleic acid detection, very labor intensive, and prone to human errors which may affect the accuracy of the subsequent nucleic acid detection.

SUMMARY

To overcome the above shortcomings, an efficient and automatic sample pre-treatment system is needed.

The present disclosure provides a sample pre-treatment system including a sample storage module, a sample transfer module, a cover separating and closing module, a delivery module, a pipetting module, and a control module. The sample storage module is configured to store a container containing a biological sample, the container includes a container body and a cover covering the container body. The sample transfer module is configured to grab the container located in the sample storage module and transfers the container to the delivery module. The delivery module is configured to deliver the container to the cover separating module and the pipetting module, respectively. The over separating and closing module is configured to scan an identification code of the container on the delivery module, and is also configured to separates the cover of the container from the container body. The pipetting module is configured to perform distribution on the biological sample in the container on the delivery module, the over separating and closing module is further configured to re-close the grabbed cover on the container body on the delivery module after the biological sample is distributed, the sample transfer module is further configured to transfer the container on the transfer module back to the sample storage module after the cover is re-closed. The control module is configured to control the sample transfer module, the over separating and closing module, the delivery module and the pipetting module to work cooperatively.

In some embodiments of the present disclosure, the sample storage module comprises a container stand base and a container frame placed on the container stand base, the container frame comprises a frame body and a base plate spaced from the frame body, the base plate is located between the frame body and the container stand base, a plurality of receiving holes for receiving the containers are defined in the frame body.

In some embodiments of the present disclosure, each of plurality of the receiving holes is provided with an elastic structure, the elastic structure comprises a fixing ring and a plurality of elastic pieces protruding from the fixing ring toward the base plate, a diameter of the fixing ring is greater than a diameter of the container, the plurality of elastic pieces jointly surround and form an accommodating space for accommodating the container, ends of the plurality of elastic pieces away from the fixing ring jointly clamp a bottom of the container.

In some embodiments of the present disclosure, the sample transfer module comprises a scheduling robot arm and a container gripper connected to the scheduling robot arm, the scheduling robot arm is configured to drive the container gripper to move to the sample storage module or the delivery module, and to control the container gripper to grab the container located on the sample transfer module or the delivery module.

In some embodiments of the present disclosure, the container gripper comprises a driving motor and two electric fingers oppositely arranged, the driving motor is configured to drive the two electric fingers to move and get relatively close, so that the container gripper can grab the container.

In some embodiments of the present disclosure, the delivery module comprises a horizontal transmission guide rail and a transmission assembly slidably arranged on the horizontal transmission guide rail, the transmission assembly comprises a sliding block slidably on the horizontal transmission guide rail, a container supporting plate fixed on the sliding block, and a container clamping unit disposed on the container supporting plate, the container clamping unit is configured to clamp the container.

In some embodiments of the present disclosure, the container clamping unit comprises a fixed block, a clamping motor and a moving block, the fixed block is fixed on the container support plate, the moving block is connected to the clamping motor and is disposed opposite to the fixed block, the clamping motor is configured to drive the moving block to move towards the fixed block to control the moving block and the fixed block jointly clamp the container body.

In some embodiments of the present disclosure, the cover separating and closing module comprises a fixing base, a code scanning unit on the fixing base, and a cover separating and closing assembly on the fixing base, the cover separating and closing assembly comprises a vertical guide rail fixed on the fixing base, a cover gripper slidably connected to the vertical guide rail, and a rotating motor connected to the cover gripper, the cover gripper is configured to grab the cover, the rotating motor is configured to drive the cover gripper to rotate, the code scanning unit is configured to scan the identification code on the container when the cover gripper rotates, the rotating motor is further configured to cooperate with the delivery module to separate the cover from the container body.

In some embodiments of the present disclosure, a sliding compensation mechanism is arranged under the fixing base, the sliding compensation mechanism is configured to drive the fixing base to move along a horizontal direction perpendicular to the vertical guide rail to adjust a position of a center line of the cover gripper.

In some embodiments of the present disclosure, the sliding block comprises a sliding body and a sliding frame fixed on the sliding body, the container supporting plate is arranged on one side of the sliding frame and is located above the sliding body, an elastic member is arranged between a bottom of the container supporting plate and the sliding body.

In some embodiments of the present disclosure, the pipetting module comprises a consumable storage position, a first horizontal pipetting guide rail adjacent to the consumable storage position, and a pipetting unit slidably disposed on the first horizontal pipetting guide rail, the consumable storage position is configured to store disposable tips and deep well plates, the pipetting unit comprises a second horizontal pipetting guide rail slidably arranged on the first horizontal pipetting guide rail, a vertical pipetting guide rail arranged on the second horizontal pipetting guide rail, and a pipette fixed on the vertical pipetting guide rail, the pipette is configured to load the disposable tip located in the consumable storage position, draw the biological sample in the container on the delivery module through the disposable tip, and transfer the drawn biological sample to the deep well plate in the consumable storage position.

In some embodiments of the present disclosure, the sample pre-treatment system further comprises housing, a partition is provided in the housing, and the partition is configured to divide the housing into an upper cavity and a lower cavity that are isolated from each other, the upper cavity is an airtight cavity, the upper cavity is configured to accommodate the sample storage module, the sample transfer module, the cover separating and closing module, the delivery module, the pipetting module, and the control module.

In some embodiments of the present disclosure, the upper cavity is provided with a purification module, the purification module comprises an intake filter unit and an exhaust filter unit, an air duct is also provided in the upper cavity, an air intake end and an air exhaust end of the air duct communicate with the intake filter unit and the exhaust filter unit respectively, both the intake filter unit and the exhaust filter unit comprise a fan and an air filter.

In some embodiments of the present disclosure, the pipetting module further comprises a tip recycling bucket located in the lower cavity, the partition is provided with an opening corresponding to the tip recycling bucket, the pipette is configured to discard the disposable tip which is used into the tip recycling barrel through the opening after the pipette draws the biological sample.

The present disclosure provides a sample pre-treatment system including a sample storage module, a sample transfer module, a cover separating and closing module, a delivery module, a pipetting module, a container recycling bucket, and a control module. The sample storage module is configured to store a container containing a biological sample, the container includes a container body and a cover covering the container body. The sample transfer module is configured to grab the container located in the sample storage module and transfers the container to the delivery module. The delivery module is configured to deliver the container to the cover separating module and the pipetting module, respectively. The over separating and closing module is configured to scan an identification code of the container on the delivery module, and is also configured to separates the cover of the container from the container body. The pipetting module is configured to perform distribution on the biological sample in the container on the delivery module, the over separating and closing module is further configured to re-close the grabbed cover on the container body on the delivery module after the biological sample is distributed, the sample transfer module is further configured to discard the container on the transfer module into the container recycling bucket after the cover is re-closed. The control module is configured to control the sample transfer module, the over separating and closing module, the delivery module and the pipetting module to work cooperatively.

Through the cooperative operation of the sample transfer module, the cover separating and closing module, the delivery module, and the pipetting module, the present disclosure performs processes such as information checking, test tube uncapping, pipetting, test tube cap closing, and recovery, thereby realizing a one-stop automatic plate transfer process, which is conducive to improving subsequent nucleic acid detection speed; on the other hand, due to the reduction of human intervention, he error-prone situation of manual subpackaging and transferring can be avoided, which is conducive to improving the accuracy of subsequent nucleic acid detection.

BRIEF DESCRIPTION OF THE DRAWINGS

Implementations of the present technology will now be described, by way of embodiment, with reference to the attached figures. Obviously, the drawings are only some embodiments of the present disclosure. For those of ordinary skill in the art, other drawings can be obtained based on these drawings without creative work.

Figure 1:
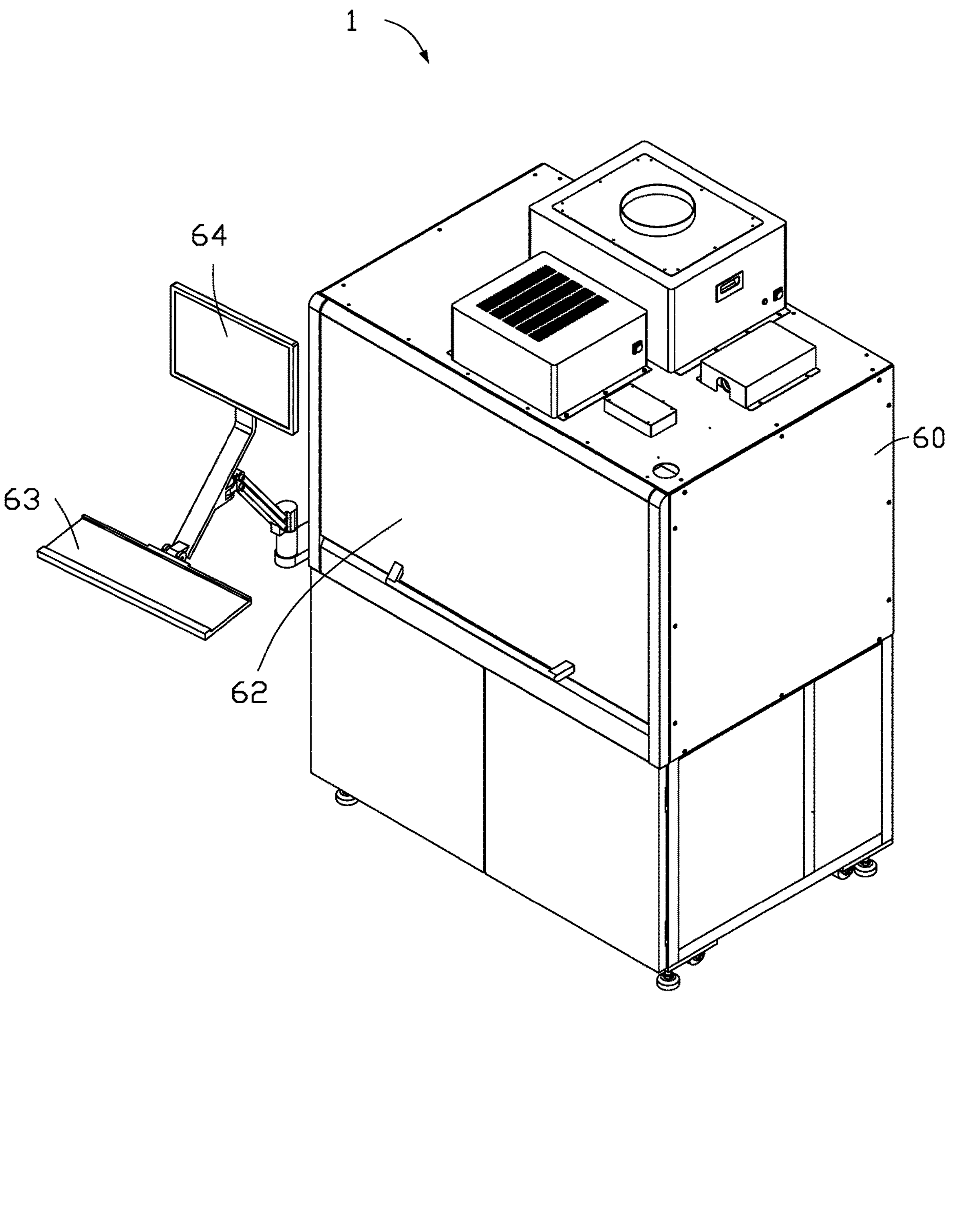
FIG. 1 is a schematic structure view of an overall structure of a sample pre-treatment system according to an embodiment of the present disclosure.

Symbol description of main components:

Sample pre-treatment system 1; container 2; disposable tip 3; deep well plate 4; sample storage module 10; container stand base 11; container frame 12; sample transfer module 20; scheduling robot arm 21; container gripper 22; cover separating and closing module 30; fixing base 31; code scanning unit 32; cover detector 34; cover separating and closing assembly 35; delivery module 40; horizontal transmission guide rail 41; transmission assembly 42; pipetting module 50; consumable storage position 51; first horizontal pipetting guide rail 52; pipetting unit 53; tip recycling barrel 54; housing 60; partition 61; protective door 62; adjustable bracket 63; display screen 64; purification module 70; container recycling bucket 80; frame body 120; base plate 121; elastic structure 122; container body 201; cover 202; driving motor 220; electric finger 221; supporting plate 330; vertical guide rail 350; cover gripper 351; rotating motor 352; sliding block 420; container supporting plate 421; container clamping unit 422; elastic member 423; second horizontal pipetting guide rail 530; vertical pipetting guide rail 531; pipette 532; upper cavity 601; lower cavity 602;

safety lock 620; intake filter unit 701; exhaust filter unit 702; receiving hole 1200; slide groove 1210, 331; elastic piece 1211; fixing ring 1220; accommodating space 1222; first anti-skid line 2020; sliding body 4200; sliding frame 4201; fixed block 4220; clamping motor 4221; moving block 4222; first opening 4223; second opening 4224.

Implementations of the disclosure will now be described, by way of embodiments only, with reference to the drawings.

DETAILED DESCRIPTION

Implementations of the disclosure will now be described, by way of embodiments only, with reference to the drawings. The described embodiments are only some embodiments of the present disclosure, rather than all the embodiments. The disclosure is illustrative only, and changes may be made in the detail within the principles of the present disclosure. It will, therefore, be appreciated that the embodiments may be modified within the scope of the claims.

It should be noted that when a component is referred to as being "fixed to" or "mounted on" another component, the component can be directly on another component or a middle component may exist therebetween. When a component is considered to be "arranged on" another component, the component can be directly on another component or a middle component may exist therebetween. The term "and/or" as used herein means any combinations of one or more related listed items.

Figure 2:
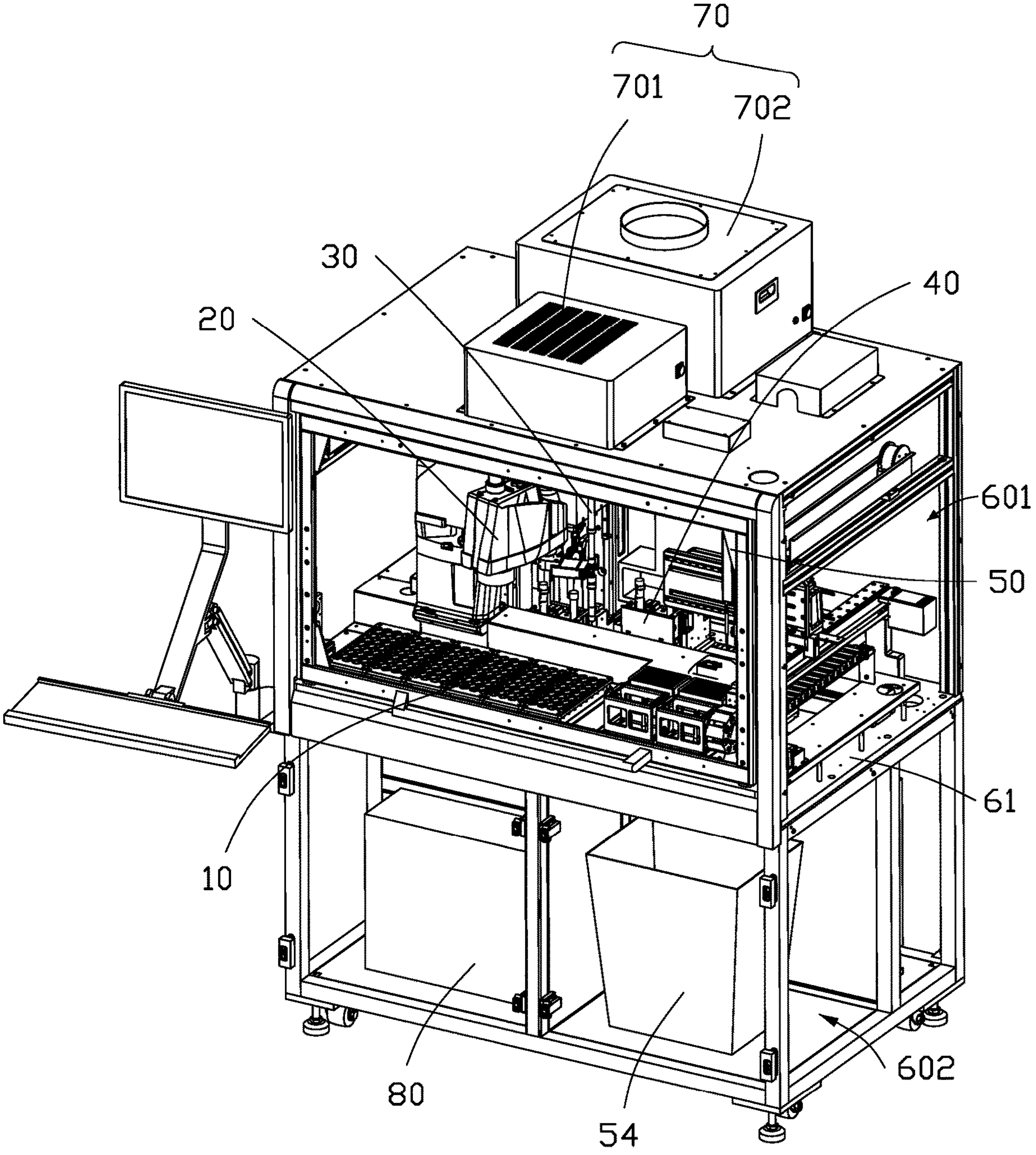
FIG. 2 is a schematic structure view of the sample pre-treatment system in FIG. 1 with part of a housing.
Figure 3:
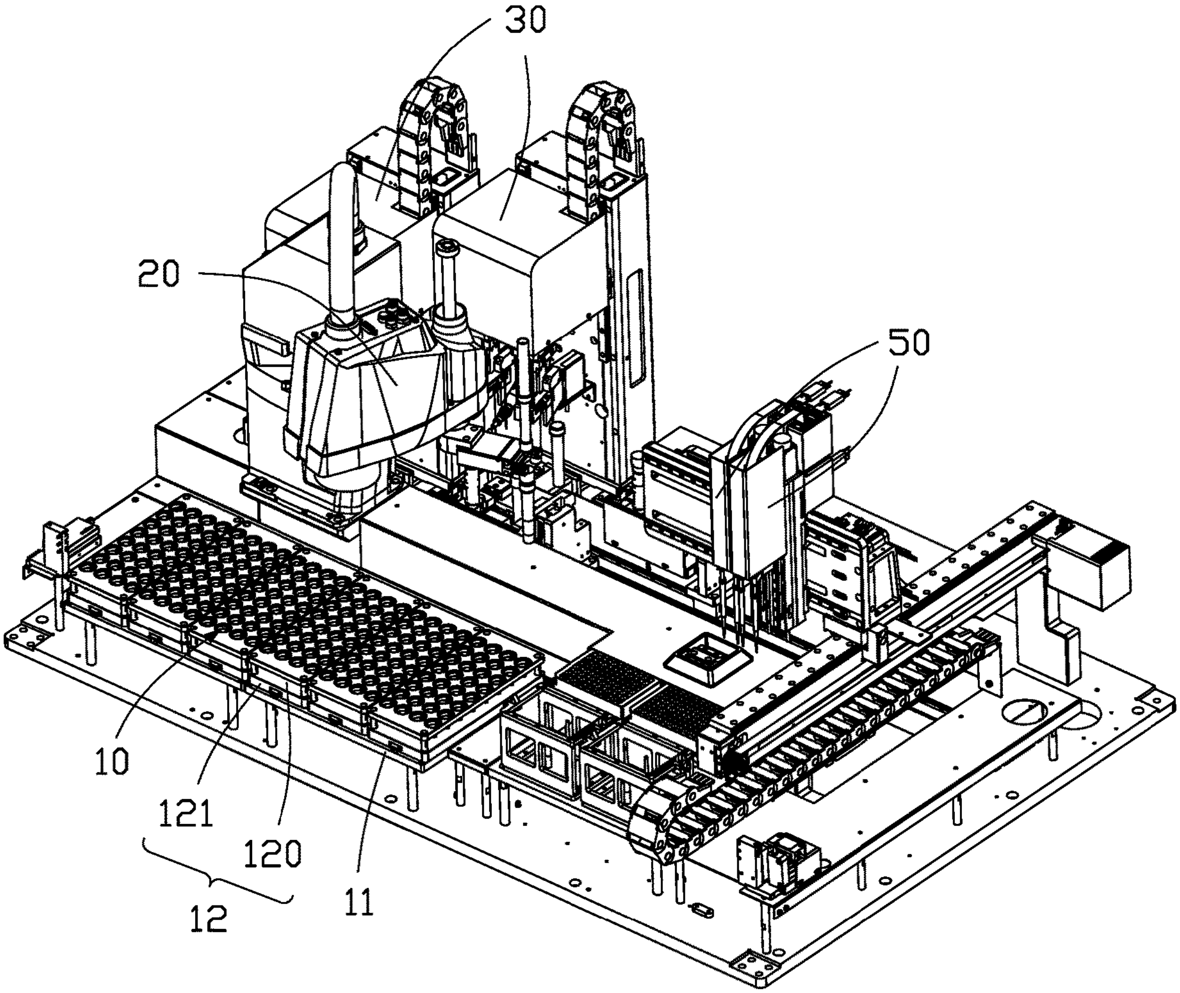
FIG. 3 is a schematic structure view of modules of the sample pre-treatment system located in an upper cavity of the housing in FIG. 2.
Figure 4:
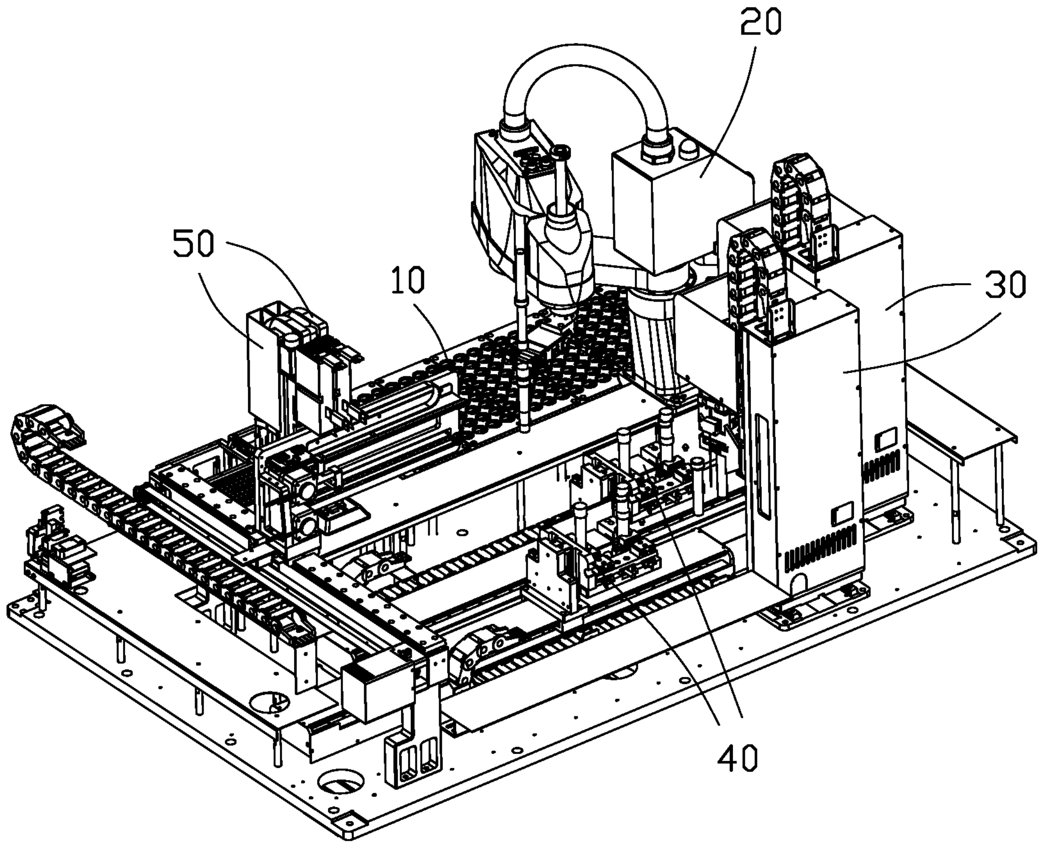
FIG. 4 is a schematic structure view of another angle of the sample pre-treatment system in FIG. 3.

FIG. 1 is a schematic structure view of an overall structure of a sample pre-treatment system 1 according to an embodiment of the present disclosure. The sample pre-treatment system 1 is used to complete the subpackaging and transferring of biological samples, including steps such as information checking, test tube uncapping, pipetting, test tube cap closing, and recycling. Wherein, the biological samples may be a human blood sample, a tissue sample or a saliva sample, etc. Referring to FIGS. 2 to 4 together, the sample pre-treatment system 1 includes a sample storage module 10, a sample transfer module 20, at least one cover separating and closing module 30, at least one delivery module 40, a pipetting module 50, and a control module (not shown).

Figure 12:
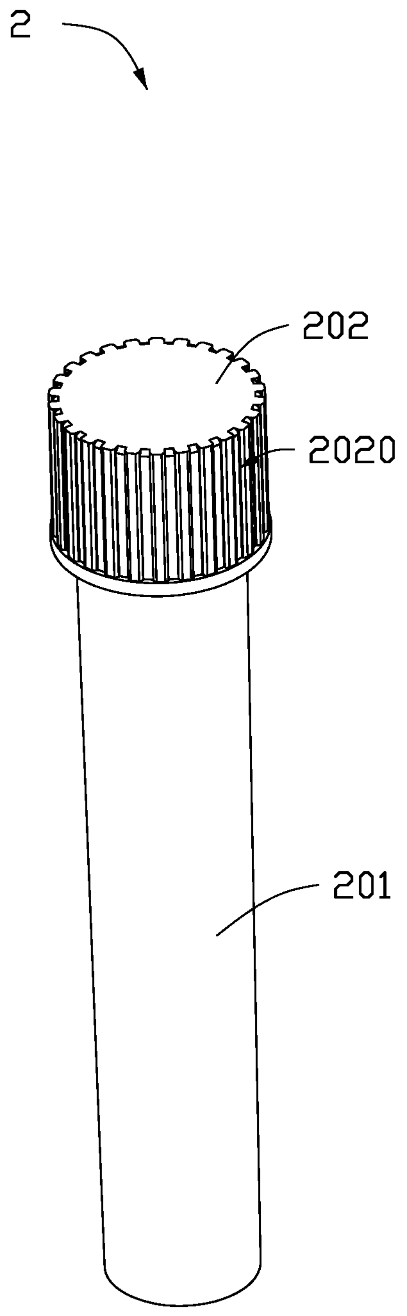
FIG. 12 is a schematic structure view of a container according to an embodiment of the present disclosure.

The sample storage module 10 is used to store a container 2 (shown in FIG. 12) containing a biological sample. Wherein, the container 2 may be a test tube or any other sealed container of any shape that can be used to contain the biological sample. Referring to FIG. 12, in this embodiment, the container 2 is a test tube. The container 2 includes a container body 201 and a cover 202 covering the container body 201. An identification code (such as a two-dimensional code or a bar code, etc., not shown) is attached to the container 2. The identification code records identification information of the corresponding biological sample, such as name, age, and test items of the test object, and is used for tracking and management of the biological sample.

The sample transfer module 20 is used to grab the container 2 located in the sample storage module 10 and transfer it to the delivery module 40.

The delivery module 40 can move between the cover separating and closing module 30 and the pipetting module 50, so as to transfer the container 2 on the delivery module 40 to positions of the cover separating and closing module 30 and the pipetting module 50, respectively.

The cover separating and closing module 30 is used to scan the identification code provided on the container 2 on the transmission module 40 to obtain corresponding identification information, and is also used to separate the cover 202 of the container 2 from the container body 201.

The pipetting module 50 is used for performing distribution on the biological sample in the container 2 on the delivery module 40 after the cover separating and closing module 30 separates the cover 202. The cover separating and closing module 30 is also used to re-close the grabbed cover 202 on the container body 201 on the delivery module 40 after the pipetting module 50 completes the distribution on the biological sample. The sample transfer module 20 is also used to transfer the container 2 on the transmission module 40 back to the sample storage module 10 after the cover 202 is re-closed by the cover separating and closing module 30.

The control module is used to control a cooperative operation of the sample transfer module 20, the cover separating and closing module 30, the delivery module 40, and the pipetting module 50.

Wherein, referring to FIGS. 1 and 2, the sample pre-treatment system 1 may further include a housing 60. A partition 61 is provided in the housing 60, and the partition 61 is used to divide the housing 60 into an upper cavity 601 and a lower cavity 602 that are isolated from each other. Both the upper cavity 601 and the lower cavity 602 are airtight cavities. The upper cavity 601 is used to accommodate the sample storage module 10, the sample transfer module 20, the cover separating and closing module 30, the delivery module 40, the pipetting module 50, and the control module, thereby avoiding environmental pollution and cross-contamination between biological samples.

In another embodiment, referring to FIG. 2, the sample pre-treatment system 1 may further include a container recycling bucket 80 located in the lower cavity 602. The sample transfer module 20 can also discard the container 2 into the container recycling bucket 80 after the cover 202 is re-closed by the cover separating and closing module 30.

In the present disclosure, through the cooperative operation of the sample transfer module 20, the cover separating and closing module 30, the delivery module 40, and the pipetting module 50, processes such as information checking, test tube uncapping, pipetting, test tube cap closing, and recovery are carried out, thereby realizing a one-stop automatic plate transfer process, which is conducive to improving subsequent nucleic acid detection speed. On the other hand, the whole process does not require direct contact between the operator and the biological sample. Due to the reduction of human intervention, the error-prone situation of manual subpackaging and transferring can be avoided, which is conducive to improving the accuracy of subsequent nucleic acid detection.

Figure 5:
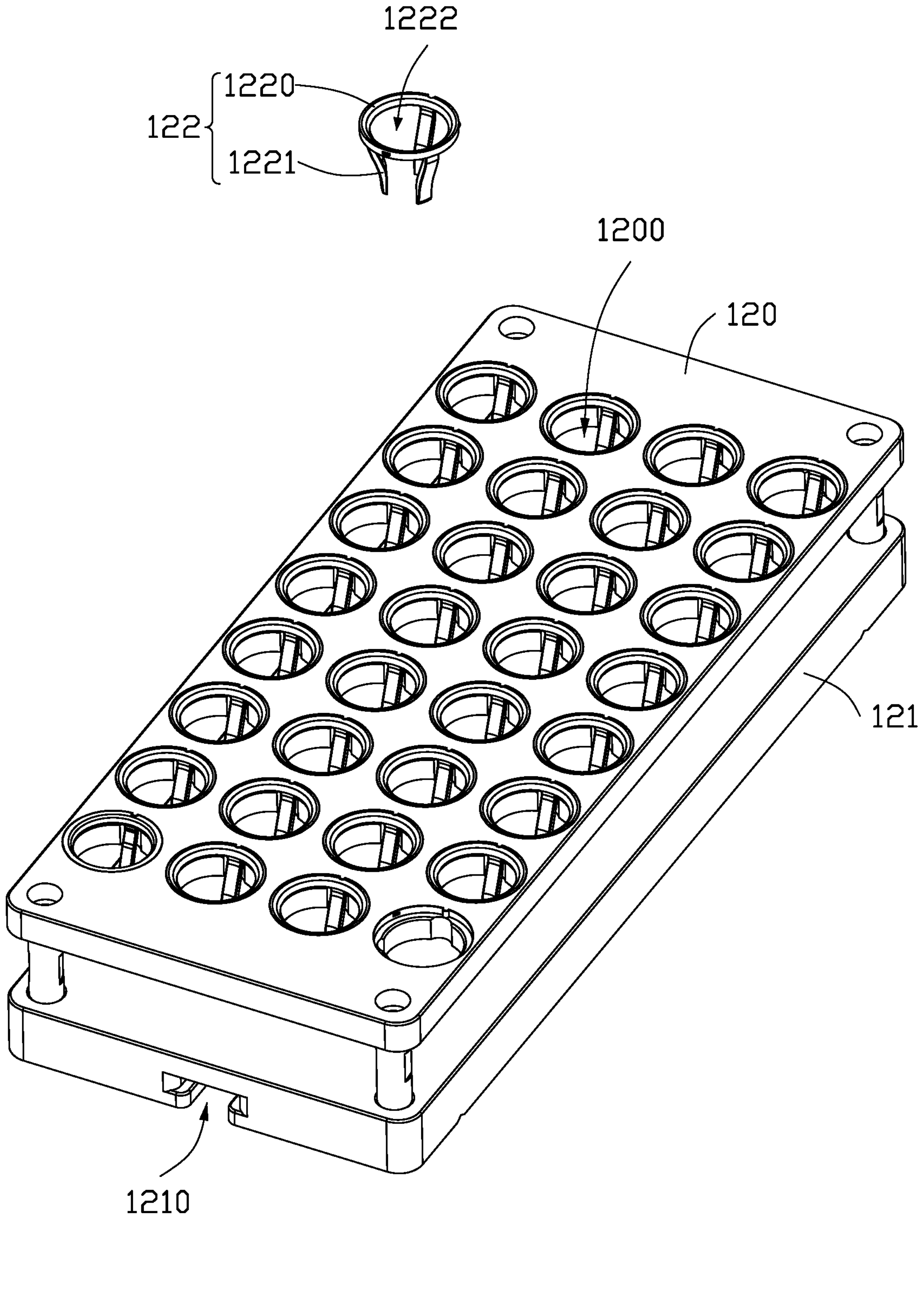
FIG. 5 is a schematic structure view of a container frame of the sample pre-treatment system in FIG. 3.
Figure 6:
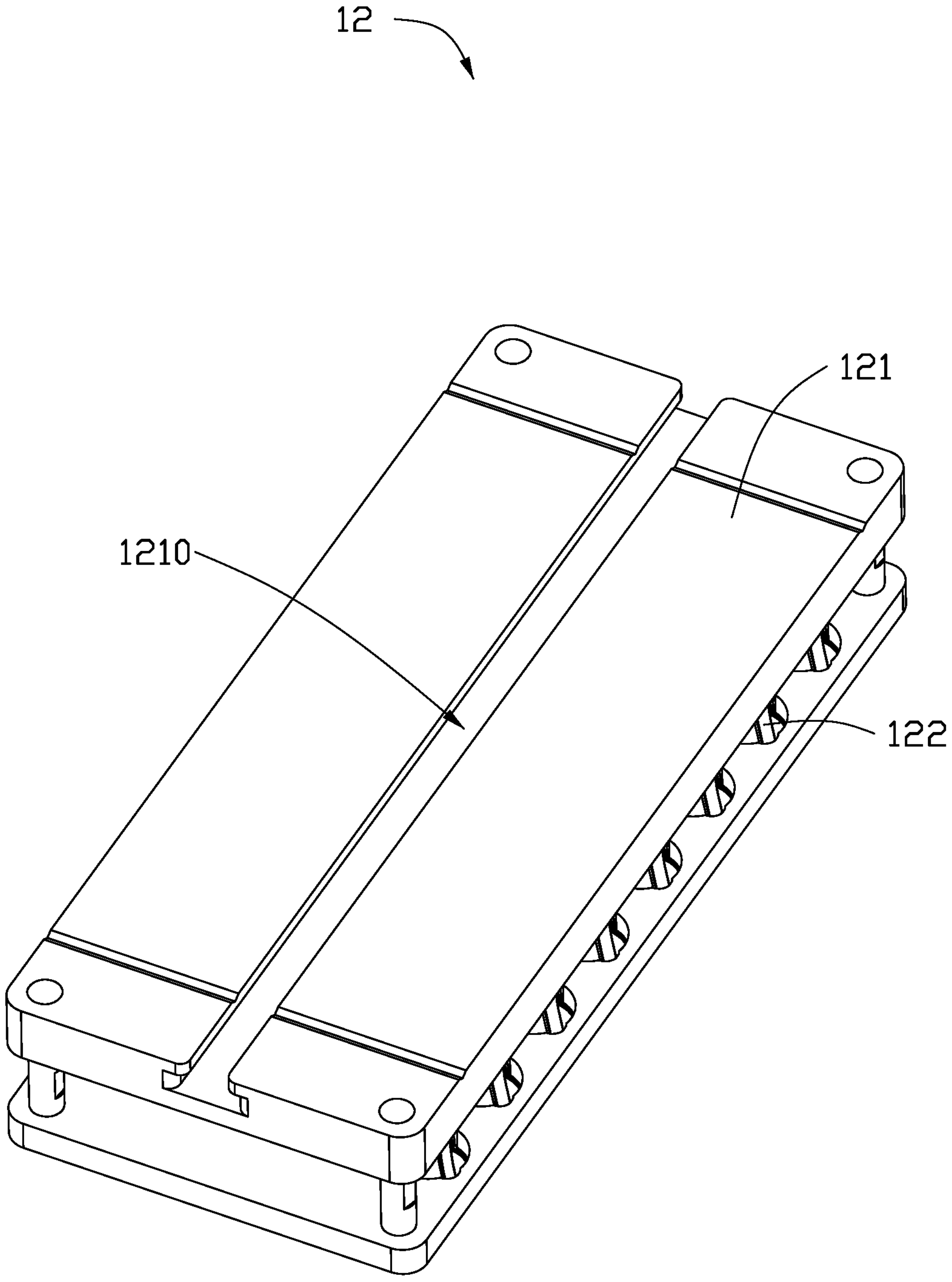
FIG. 6 is a schematic structure view of another angle of a frame body of the container frame of the sample pre-treatment system in FIG. 5.

Referring to FIGS. 3, 5, and 6, in one embodiment, the sample storage module 10 includes a container stand base 11 and a container frame 12 placed on the container stand base 11. The container 2 is placed on the container frame 12. The number of container frames 12 that can be placed on the container stand base 11 is not limited, as shown in FIG. 3, in one embodiment, the sample storage module 10 includes two container stand bases 11. Three container frames 12 can be placed on each container stand base 11, that is, the sample storage module can place six container frames 12 at a time.

Wherein, the container frame 12 includes a frame body 120 and a base plate 121, and the base plate 121 is located between the frame body 120 and the container stand base 11. A plurality of receiving holes 1200 for receiving the containers 2 are defined in the frame body 120, and the plurality of receiving holes 1200 may be arranged in a matrix. There may be a preset distance between different receiving holes 1200. Each of the receiving holes 1200 is provided with an elastic structure 122. The elastic structure 122 includes a fixing ring 1220 and a plurality of elastic pieces 1221 protruding from the fixing ring 1220 toward the base plate 121. A diameter of the fixing ring 1220 is greater than a diameter of the container 2. The plurality of elastic pieces 1221 jointly surround and form an accommodating space 1222 for accommodating the container 2. When the elastic pieces 1221 is not elastically deformed, a diameter of the accommodating space 1222 gradually decreases from a side close to the fixing ring 1220 to the other side away from the fixing ring 1220. When the container 2 is placed in the accommodating space 1222, ends of the elastic pieces 1221 away from the fixing ring 1220 jointly clamp a bottom of the container 2, thereby fixing the container 2. It can be understood that since the elastic pieces 1221 can be elastically deformed, when each of the containers 2 with different diameters are placed in the accommodating space 1222, the container 2 can be quickly positioned in the container frame 12 due to the clamping of the elastic pieces 1221, that is, the container frame 12 can accommodate the containers 2 with various sizes. Furthermore, the diameter of the fixing ring 1220 is set greater than the diameter of the container 2, so that when the sample transfer module 20 subsequently transfers the container 2 back to the container frame 12, even if a central axis of the container 2 is offset from a center of the fixing ring 1220, the container 2 can be smoothly put into the accommodating space 1222, that is, it has a high error tolerance rate when the container 2 is placed.

Further, a slide rail (not shown) may be provided on the container stand base 11. The base plate 121 of the container frame 12 may be provided with a slide groove 1210 matched with the slide rail. Before the biological samples are sub-packaged and transferred, the operator can place the container frame 12 full of the containers 12 on the container stand base 11 through a cooperation the slide groove 1210 and the slide rail. Shapes of the slide rail and the slide groove 1210 are matched, for example, cross sections of the slide rail and the slide groove 1210 may both be T-shaped. Furthermore, a ball plunger (not shown) is provided on the container stand base 11, and a positioning hole (not shown) corresponding to the ball plunger may be provided in the base plate 121 of the container frame 12. The container frame 12 may be further positioned on the container stand base 11 through a cooperation of the ball plunger and the positioning hole.

Figure 7:
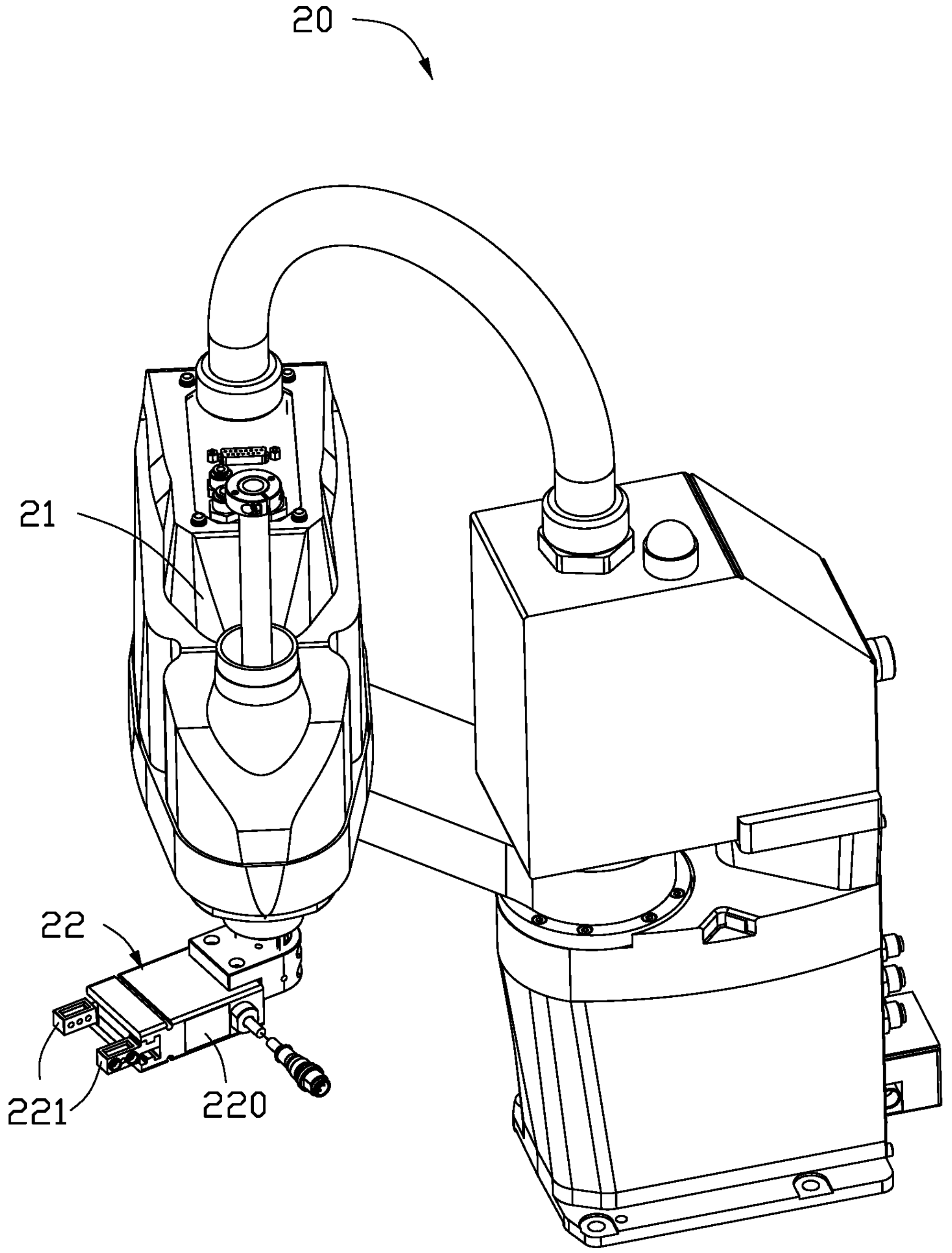
FIG. 7 is a schematic structure view of a sample transfer module of the sample pre-treatment system in FIG. 3.

Referring to FIG. 7, in one embodiment, the sample transfer module 20 includes a scheduling robot arm 21 and a container gripper 22 connected to the scheduling robot arm 21. The scheduling robot arm 21 is used to move horizontally and vertically, so as to drive the container gripper 22 to move to a position where the sample storage module 10 or the delivery module 40 is located. The container gripper 22 includes a driving motor 220 and two electric fingers 221 oppositely arranged. The driving motor 220 is used to drive the electric fingers 221 to move and get relatively close, so that the container gripper 22 may grab the container 2 located in the sample storage module 10 and transfer the container 2 to the delivery module 40 (and grab the container 2 located on the delivery module 40 and transfer the container 2 to the sample storage module 10). Since the electric fingers 221 can be relatively close together, the container gripper 22 can also accommodate various containers 2 with different diameters. In one embodiment, the scheduling robot arm 21 is a horizontal multi-joint robot arm.

Figure 8:
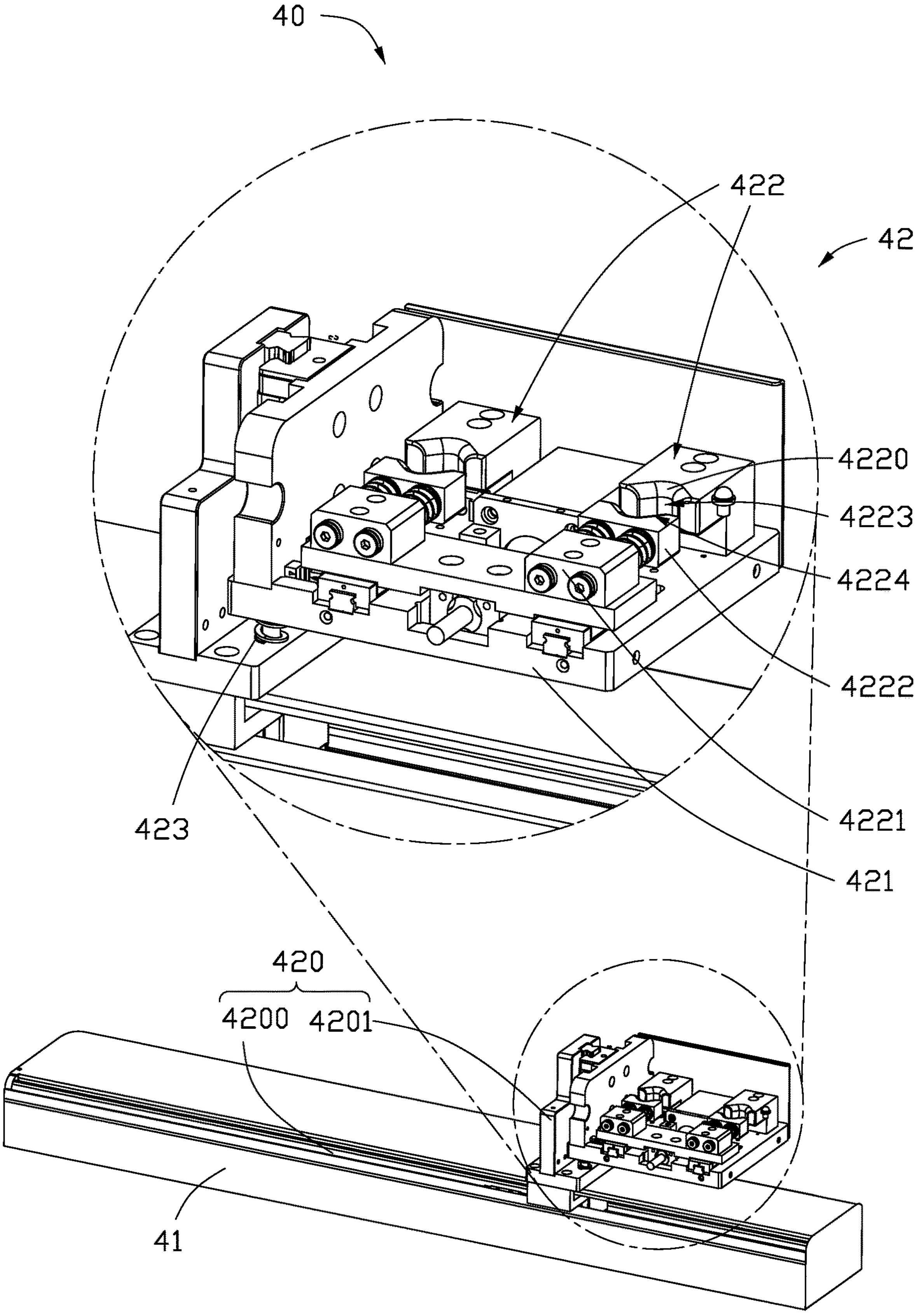
FIG. 8 is a schematic structure view of a delivery module of the sample pre-treatment system in FIG. 3.

Referring to FIG. 8, in one embodiment, the delivery module 40 includes a horizontal transmission guide rail 41 and a transmission assembly 42 slidably arranged on the horizontal transmission guide rail 41. The transmission assembly 42 includes a sliding block 420 slidably on the horizontal transmission guide rail 41, a container supporting plate 421 fixed on the sliding block 420, and at least one group of container clamping units 422 disposed on the container supporting plate 421. Each group of container clamping units 422 is used for clamping the container 2. The horizontal transmission guide rail 41 extends from the cover separating and closing module 30 to the pipetting module 50, so that the container clamping unit 422 can move between the cover separating and closing module 30 and the pipetting module 50. In one embodiment, each group of container clamping units 422 includes a fixed block 4220, a clamping motor 4221 and a moving block 4222. The fixing block 4220 is fixed on the container support plate 421. The moving block 4222 is connected to the clamping motor 4221 and is disposed opposite to the fixed block 4220. The clamping motor 4221 is used to drive the moving block 4222 to move towards the fixed block 4220, so that the moving block 4222 and the fixed block 4220 can jointly position and clamp the container 2 (the clamped part in the present disclosure is the container body 201). In one embodiment, a surface of the fixed block 4220 facing the moving block 4222 is provided with a first opening 4223. A surface of the moving block 4222 facing the fixed block 4220 is provided with a second opening 4224. The first opening 4223 and the second opening 4224 jointly form a container groove (not shown) for accommodating the container 2. Wherein, a sensor (not shown) may be provided in the container groove of the container clamping unit 422 for sensing whether the container 2 is taken and placed successfully.

Figure 9:
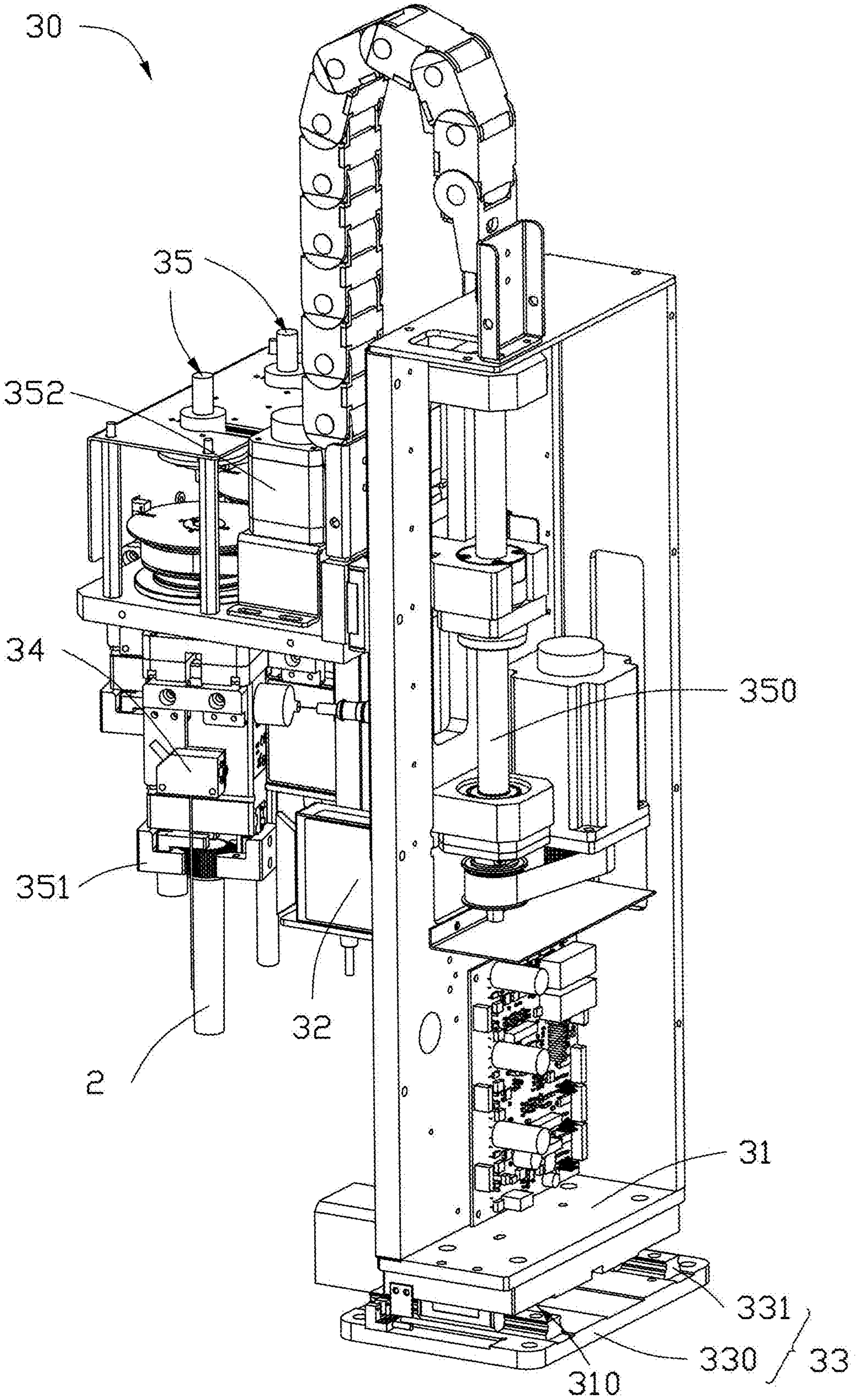
FIG. 9 is a schematic structure view of a cover separating and closing module of the sample pre-treatment system in FIG. 3.

Referring to FIG. 9, in one embodiment, the cover separating and closing module 30 includes a fixing base 31, at least one code scanning unit 32, and at least one group of cover separating and closing assembly 35. Each code scanning unit 32 and each group of cover separating and closing assembly 35 are arranged on the fixing base 31. Each group of cover separating and closing assembly 35 includes a vertical guide rail 350 fixed on the fixing base 31, a cover gripper 351 slidably connected to the vertical guide rail 350, and a rotating motor 352 connected to the cover gripper 351. The cover gripper 351 is used to descend along the vertical guide rail 350 and grab the cover 202 of the container 2 on the delivery module 40. At this time, the delivery module 40 does not clamp the container 2, and the cover 202 is not separated from the container body 201, so that the cover gripper 351 can drive the entire container 2 to rise along the vertical guide rail 350 to a position where the code scanning unit 32 is located. The rotating motor 352 is used to drive the cover gripper 351 to rotate, so that the container 2 rotates at a certain angle (for example, one rotation), which is convenient for the code scanning unit 32 to scan the identification code on the container 2 to obtain the identification information corresponding to the identification code. Wherein, referring to FIG. 12, the cover 202 is provided with first anti-skid lines 2020. The cover gripper 351 may be provided with second anti-skid lines (not shown) that matches the first anti-skid lines 2020, so the cover gripper 351 can rotate the cover 202 through a cooperation of the first anti-skid lines 2020 and the second anti-skid lines.

After scanning the identification code, the vertical guide rail 350 is also used to drive the cover gripper 351 to drive the entire container 2 down vertically, so that the container 2 is put back into the delivery module 40. The rotating motor 352 drives the cover gripper 351 to rotate again, so that the cover gripper 351 rotates the grabbed cover 202, and at the same time, the delivery module 40 clamps the container body 201 to separate the cover 202 from the container body 201. In one embodiment, the cover separating and closing module 30 further includes a sliding compensation mechanism 33 located under the fixing base 31. The sliding compensation mechanism 33 is used to drive the fixing base 31 to move along a horizontal direction perpendicular to the vertical guide rail 350, so that a position of a center line of the cover gripper 351 can be adjusted, that is, the center line of the cover gripper 351 can be aligned with the central axis of the containers 2 with different diameters, that is, the cover gripper 351 can be compatible with the containers 2 with different diameters. In one embodiment, the sliding compensation mechanism 33 includes a supporting plate 330 of the fixing base and a sliding groove 331 disposed on the supporting plate 330 of the fixing base. The sliding groove 331 extends along the horizontal direction perpendicular to the vertical guide rail 350. Correspondingly, a bottom of the fixing base 31 is provided with a sliding rail 310 that cooperates with the sliding groove 331. The fixing base 31 can slide along the horizontal direction perpendicular to the vertical guide rail 350 through a cooperation of the sliding rail 310 and the sliding groove 331, so as to adjust the position of the center line of the cover gripper 351.

Referring to FIG. 8 again, in one embodiment, the sliding block 420 includes a sliding body 4200 and a sliding frame 4201 vertically fixed on the sliding body 4200. The container supporting plate 421 is arranged on one side of the sliding frame 4201 and is located above the sliding body 4200. Wherein, an elastic member 423 (such as a coil spring) is arranged between a bottom of the container supporting plate 421 and the sliding body 4200. When the cover gripper 351 grasps the container 2, the container 2 is liable to be hit by the cover gripper 351 due to a difference in height of different containers 2. The elastic member 423 is used to provide a buffer force to relieve an impact on the container 2 and prevent the biological samples in the container 2 from splashing out. At the same time, the elastic member 423 can also relieve an impact on the container 2 when the cover gripper 351 puts the container 2 back into the delivery module 40.

On the other hand, during the uncapping process, when the rotating motor 352 drives the cover gripper 351 to rotate so that the cover gripper 351 rotates the grabbed cover 202, the delivery module 40 clamps the container body 201, while the elastic member 423 is compressed so that the container body 201 descends, as a result the cover 202 can be separated from the container body 201.

Wherein, referring to FIG. 9, the cover separating and closing module 30 may further include at least one cover detector 34. The cover detector 34 is used to detect whether the container 2 on the delivery module 40 is provided with a cover 202, so as to prevent the cover gripper 351 from repeatedly grasping the container 2 that has been removed.

Figure 10:
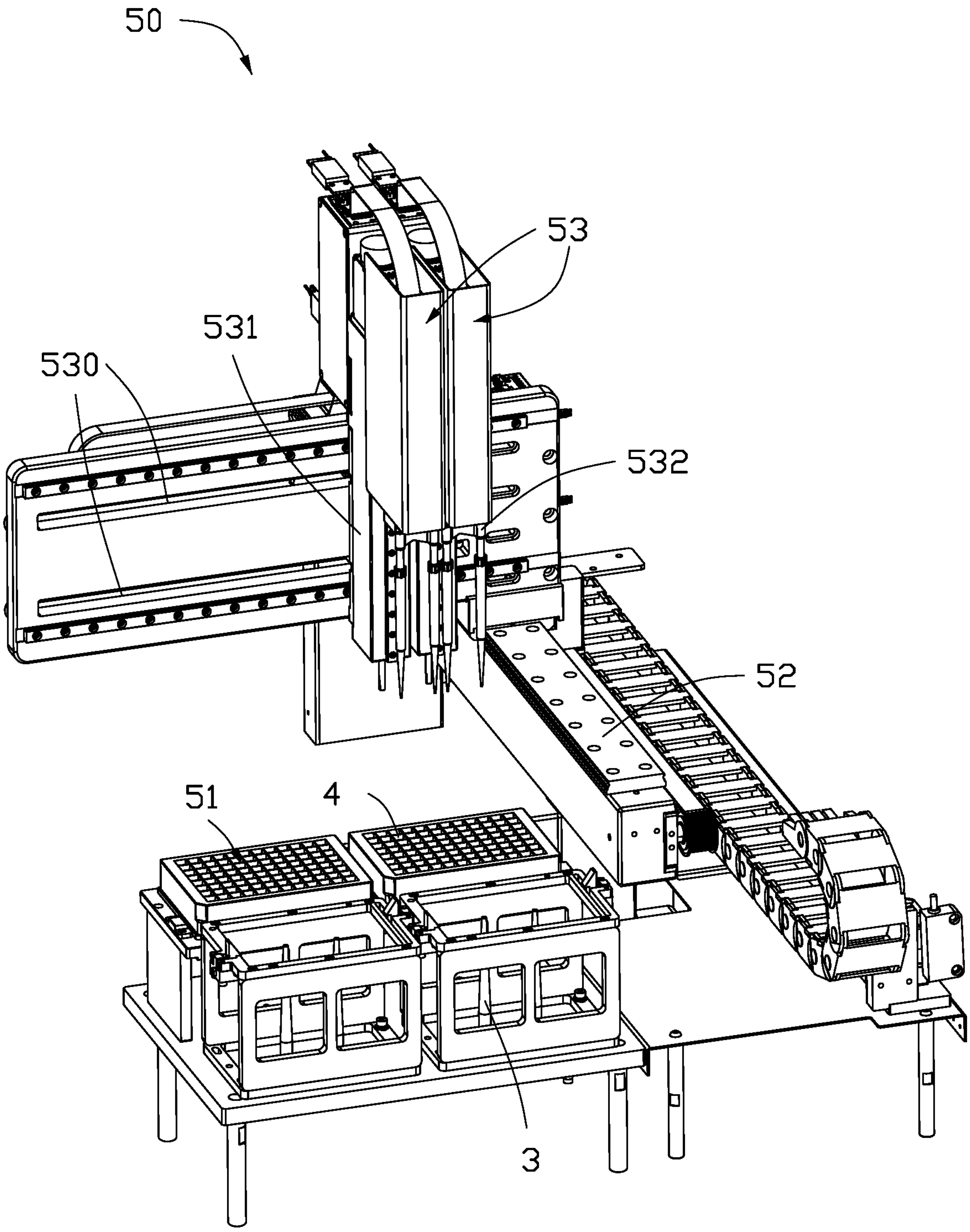
FIG. 10 is a schematic structure view of a pipetting module of the sample pre-treatment system in FIG. 3.

Referring to FIG. 10, in one embodiment, the pipetting module 50 includes a consumable storage position 51, a first horizontal pipetting guide rail 52 adjacent to the consumable storage position 51, and at least one group of pipetting units 53 slidably disposed on the first horizontal pipetting guide rail 52. The consumable storage position 51 is used to store consumables required for pipetting, and the above-mentioned consumables may be, but not limited to, disposable tips 3, deep well plates 4, etc. Each group of pipetting units 53 includes a second horizontal pipetting guide rail 530 slidably arranged on the first horizontal pipetting guide rail 52, a vertical pipetting guide rail 531 arranged on the second horizontal pipetting guide rail 530, and a pipette 532 fixed on the vertical pipetting guide rail 531. Therefore, the pipette 532 can move horizontally and vertically to the consumable storage position 51 and load the disposable tip 3 located in the consumable storage position 51, then draw the biological sample in the container 2 on the delivery module 40 through the disposable tip 3 and transfer the drawn biological sample to the deep well plate 4 in the consumable storage position 51. In one embodiment, the pipetting module 50 includes two groups of pipetting units 53. Since in the two groups of pipetting units 53, the two pipettes 532 move independently on different second horizontal pipetting guide rails 530 and different vertical pipetting guide rails 531, distance between the two pipettes 532 is adjustable. In one embodiment, the pipetting module 50 further includes a tip recycling bucket 54 (shown in FIG. 2) located in the lower cavity 602, and the partition 61 is provided with an opening (not shown) corresponding to the tip recycling bucket 54. After drawing the biological sample, the pipette 532 can also move to the top of the tip recycling barrel 54 and discard the used disposable tips 3 into the tip recycling barrel 54 through the opening.

Referring to FIG. 9, in one embodiment, each cover separating and closing module 30 include two groups of cover separating and closing assemblies 35 and two code scanning units 32. The two groups of cover separating and closing assemblies 35 operate independently, and the two code scanning units 32 cooperate with the two groups of disengagement cover assemblies 35, respectively. Correspondingly, as shown in FIG. 8, each delivery module 40 includes two groups of container clamping units 422, and the two groups of container clamping units 422 cooperate with two groups of cover separating and closing assemblies 35 respectively. Therefore, it is beneficial to improve the efficiency of scanning the code and the efficiency of removing and closing the cover of the container 2. At the same time, the two groups of pipetting units 53 of the pipetting module 50 cooperate with two groups of container clamping units 422 respectively, which is beneficial to improve the efficiency of pipetting. Of course, in other embodiment, the number of the cover separating and closing assemblies 35 and the number of the code-scanning units 32 of each cover separating and closing module 30 and the number of the container clamping units 422 of each delivery module 40 are not limited, and can be set according to actual needs.

Further, as shown in FIGS. 3 and 4, there are two cover separating and closing modules 30 and two delivery modules 40. The cover separating and closing modules 30 operate in parallel, and the two delivery modules 40 operate in parallel and cooperate with the two cover separating and closing modules 30 respectively, so that the efficiency of scanning the code and the efficiency of removing and closing the cover of the container 2 can be further improved. Certainly, in other embodiment, the number of the cover separating and closing modules 30 and the number of the delivery modules 40 are not limited, and can be set according to actual needs.

Referring to FIGS. 1 and 2 again, in one embodiment, the upper cavity 601 is provided with a purification module 70. The purification module 70 includes an intake filter unit 701 and an exhaust filter unit 702. In one embodiment, the intake filter unit 701 and the exhaust filter unit 702 are located on a top plate of the housing 60. An air duct (not shown) is also provided in the upper cavity 601, and an air intake end and an air exhaust end of the air duct communicate with the intake filter unit 701 and the exhaust filter unit 702 respectively. Wherein, both the intake filter unit 701 and the exhaust filter unit 702 include a fan and an air filter. When the outside air enters the upper cavity 601 from the intake filter unit 701, it can be filtered by the air filter of the intake filter unit 701, and then after passing through the air duct, it is discharged by the exhaust filter unit 702, and the air duct in the exhaust filter unit 702 can filter the air again to prevent the environment from being polluted during the exhaust process. In one embodiment, a flow rate of the fan of the intake filter unit 701 is a fixed value. The fan of the exhaust filter unit 702 is in a stepless speed regulation mode, so that the pressure in the upper cavity 601 is maintained at a fixed value. The purification module 70 may also include an ultraviolet disinfection lamp (not shown) located in the upper cavity 601 for surface disinfection of each internal module.

Figure 11:
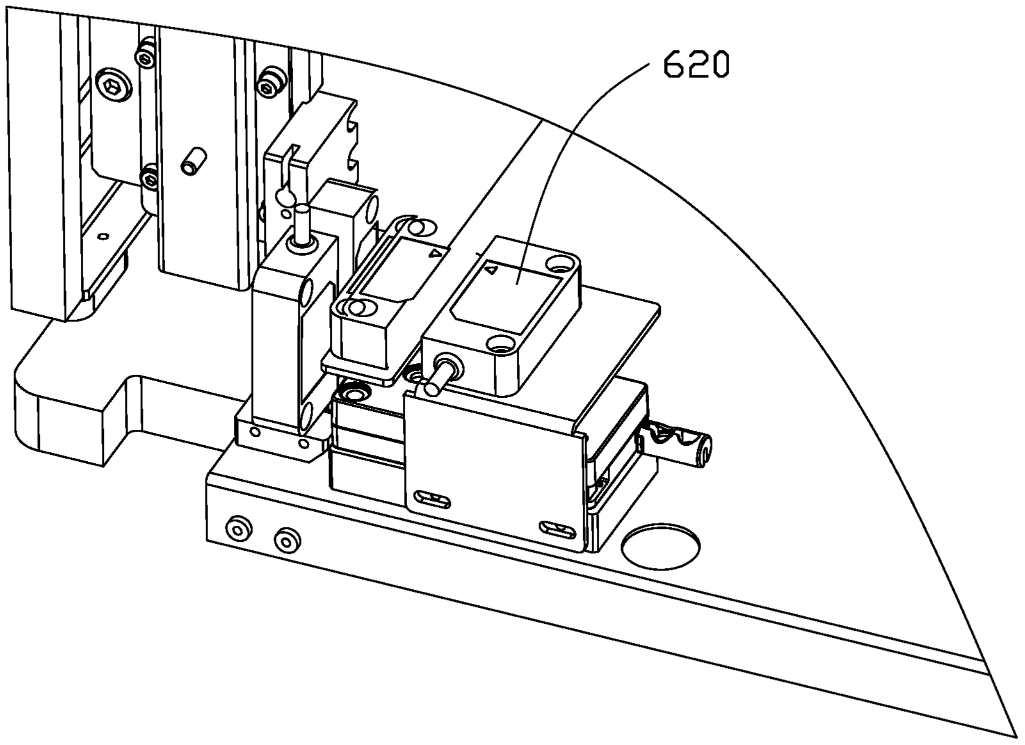
FIG. 11 is a schematic structure view of a safety lock in the upper cavity in FIG. 3.

Referring to FIGS. 1 and 11, in one embodiment, the housing 60 is provided with a protective door 62 that can be opened and closed. A safety lock 620 for locking the protective door 62 is provided in the upper cavity 601 to ensure the safety of the system during operation. An adjustable bracket 63 may further be provided outside the housing 60, and a display screen 64 is installed on the adjustable bracket 63. In this way, the operator can monitor the operation of each module inside the housing 60 through the display screen 64, so that manual intervention can be performed in time when the operation is abnormal.

In one embodiment, the control module includes a control program for controlling the cooperative operation of the sample transfer module 20, the cover separating and closing module 30, the delivery module 40, and the pipetting module 50. The control program is used to perform the following methods when running:

Step 1: the sample transfer module 20 grabs the container 2 located in the sample storage module 10 and transfers it to the delivery module 40.

Step 2: the conveying component 42 of the conveying module 40 drives the container 2 to move along the horizontal transmission guide rail 41 to the bottom of the cover separating and closing module 30.

Step 3: the cover gripper 351 of the cover separating and closing module 30 grabs the cover 202 of the container 2 on the delivery module 40, and drives the entire container 2 to move to the position of the code scanning unit 32 through the cover 202. The rotating motor 352 drives the cover gripper 351 to rotate, and at the same time, the code scanning unit 32 scans the identification code on the container 2 to obtain the identification information corresponding to the identification code.

Step 4: the cover gripper 351 of the cover separating and closing module 30 puts the container 2 back into the delivery module 40, and the rotating motor 352 drives the cover gripper 351 to rotate again, so that the cover gripper 351 rotates the grabbed cover 202, and at the same time, the container clamping unit 422 of the delivery module 40 clamps the container body 201 to separate the cover 202 from the container body 201.

Step 5: the transmission assembly 42 of the delivery module 40 drives the uncapped container 2 to move along the horizontal transmission guide rail 41 to the bottom of the pipetting module 50.

Step 6: the pipetting module 50 loads the disposable tip 3 located in the consumable storage position 51, and then draws the biological sample in the container 2 on the delivery module 40 through the disposable tip 3, and transfers the drawn biological sample to the deep well plate 4 in the consumable storage position 51, and then discards the used disposable tips 3 in the tip recycling bucket.

Step 7: the transmission assembly 42 of the delivery module 40 drives the uncapped container 2 to move along the horizontal transmission guide rail 41 to the bottom of the cover separating and closing module 30.

Step 8: the cover gripper 351 of the cover separating and closing module 30 closes the grabbed cover 202 on the container body 201 of the container 2 again.

Step 9: the sample transfer module 20 transfers the container 2 back to the sample storage module 10 or discards it in the container recycling bucket 80.

Even though information and advantages of the embodiments have been set forth in the foregoing description, together with details of the structures and functions of the embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A sample pre-treatment system comprising:

a sample storage module;

a sample transfer module;

a cover separating and closing module;

a delivery module;

a pipetting module; and a control module;

wherein the sample storage module is configured to store a container containing a biological sample, the container comprises a container body and a cover covering the container body; the sample transfer module is configured to grab the container located in the sample storage module and transfers the container to the delivery module; the delivery module is configured to deliver the container to the cover separating module and the pipetting module, respectively; the cover separating and closing module is configured to scan an identification code of the container on the delivery module, and is also configured to separates the cover of the container from the container body; the pipetting module is configured to perform distribution on the biological sample in the container on the delivery module, the cover separating and closing module is further configured to re-close the grabbed cover on the container body on the delivery module after the biological sample is distributed, the sample transfer module is further configured to transfer the container on the transfer module back to the sample storage module after the cover is re-closed; the control module is configured to control the sample transfer module, the cover separating and closing module, the delivery module and the pipetting module to work cooperatively;

wherein the cover separating and closing module comprises a fixing base, a code scanning unit on the fixing base, and a cover separating and closing assembly on the fixing base, the cover separating and closing assembly comprises a vertical guide rail fixed on the fixing base, a cover gripper slidably connected to the vertical guide rail, and a rotating motor connected to the cover gripper, the cover gripper is configured to grab the cover, the rotating motor is configured to drive the cover gripper to rotate, the code scanning unit is configured to scan the identification code on the container when the cover gripper rotates, the rotating motor is further configured to cooperate with the delivery module to separate the cover from the container body;

wherein the cover separating and closing module further comprises a sliding compensation mechanism arranged under the fixing base, the sliding compensation mechanism comprises a supporting plate of the fixing base and a sliding groove disposed on the supporting plate of the fixing base, the sliding groove extends linearly along a horizontal direction perpendicular to the vertical guide rail, a bottom of the fixing base is provided with a sliding rail configured to cooperate with the sliding groove, the fixing base is linearly slidable along the horizontal direction perpendicular to the vertical guide rail through a cooperation of the sliding rail and the sliding groove to adjust a position of a center line of the cover gripper with respect to the delivery module, such that the center line of the cover gripper is aligned with a central axis of the container on the delivery module.

2. The sample pre-treatment system of claim 1, wherein the sample storage module comprises a container stand base and a container frame placed on the container stand base, the container frame comprises a frame body and a base plate spaced from the frame body, the base plate is located between the frame body and the container stand base, a plurality of receiving holes for receiving the containers are defined in the frame body.

3. The sample pre-treatment system of claim 2, wherein each of the plurality of receiving holes is provided with an elastic structure, the elastic structure comprises a fixing ring and a plurality of elastic pieces protruding from the fixing ring toward the base plate, a diameter of the fixing ring is greater than a diameter of the container, the plurality of elastic pieces jointly surround and form an accommodating space for accommodating the container, ends of the plurality of elastic pieces away from the fixing ring jointly clamp a bottom of the container.

4. The sample pre-treatment system of claim 1, wherein the sample transfer module comprises a scheduling robot arm and a container gripper connected to the scheduling robot arm, the scheduling robot arm is configured to drive the container gripper to move to the sample storage module or the delivery module, and to control the container gripper to grab the container located on the sample transfer module or the delivery module.

5. The sample pre-treatment system of claim 4, wherein the container gripper comprises a driving motor and two electric fingers oppositely arranged, the driving motor is configured to drive the two electric fingers to move and get relatively close, so that the container gripper can grab the container.

6. The sample pre-treatment system of claim 1, wherein the delivery module comprises a horizontal transmission guide rail and a transmission assembly slidably arranged on the horizontal transmission guide rail, the transmission assembly comprises a sliding block slidably on the horizontal transmission guide rail, a container supporting plate fixed on the sliding block, and container clamping unit disposed on the container supporting plate, the container clamping unit is configured to clamp the container.

7. The sample pre-treatment system of claim 6, wherein the container clamping unit comprises a fixed block, a clamping motor and a moving block, the fixed block is fixed on the container support plate, the moving block is connected to the clamping motor and is disposed opposite to the fixed block, the clamping motor is configured to drive the moving block to move towards the fixed block to control the moving block and the fixed block jointly clamp the container body.

8. The sample pre-treatment system of claim 7, wherein a surface of the fixed block facing the moving block defines a first opening, a surface of the moving block facing the fixed block defines a second opening, the first opening and the second opening jointly form a container groove for accommodating the container.

9. The sample pre-treatment system of claim 6, wherein the sliding block comprises a sliding body and a sliding frame fixed on the sliding body, the container supporting plate is arranged on one side of the sliding frame and is located above the sliding body, an elastic member is arranged between a bottom of the container supporting plate and the sliding body, and the elastic member is configured to be compressed in response to the rotating motor driving the cover gripper to rotate the cover with respect to the container body, such that the container body descends to cause the cover to be separated from the container body.

10. The sample pre-treatment system of claim 6, wherein an extending direction of the sliding groove or the sliding rail is perpendicular to an extending direction of the vertical guide rail.

11. The sample pre-treatment system of claim 1, wherein the pipetting module comprises a consumable storage position, a first horizontal pipetting guide rail adjacent to the consumable storage position, and a pipetting unit slidably disposed on the first horizontal pipetting guide rail, the consumable storage position is configured to store disposable tips and deep well plates, the pipetting unit comprises a second horizontal pipetting guide rail slidably arranged on the first horizontal pipetting guide rail, a vertical pipetting guide rail arranged on the second horizontal pipetting guide rail, and a pipette fixed on the vertical pipetting guide rail, the pipette is configured to load the disposable tip located in the consumable storage position, draw the biological sample in the container on the delivery module through the disposable tip, and transfer the drawn biological sample to the deep well plate in the consumable storage position.

12. The sample pre-treatment system of claim 11, further comprises housing, wherein a partition is provided in the housing, and the partition is configured to divide the housing into an upper cavity and a lower cavity that are isolated from each other, the upper cavity is an airtight cavity, the upper cavity is configured to accommodate the sample storage module, the sample transfer module, the cover separating and closing module, the delivery module, the pipetting module, and the control module.

13. The sample pre-treatment system of claim 12, wherein the upper cavity is provided with a purification module, the purification module comprises an intake filter unit and an exhaust filter unit, an air duct is also provided in the upper cavity, an air intake end and an air exhaust end of the air duct communicate with the intake filter unit and the exhaust filter unit respectively, both the intake filter unit and the exhaust filter unit comprise a fan and an air filter.

14. The sample pre-treatment system of claim 12, wherein the pipetting module further comprises a tip recycling bucket located in the lower cavity, the partition is provided with an opening corresponding to the tip recycling bucket, the pipette is configured to discard the disposable tip which is used into the tip recycling barrel through the opening after the pipette draws the biological sample.

15. The sample pre-treatment system of claim 1, further comprising a container recycling bucket, wherein the sample transfer module is further configured to discard the container on the transfer module into the container recycling bucket after the cover is re-closed.

* * * * *